United States Patent
Yatake

(10) Patent No.: US 9,039,130 B2
(45) Date of Patent: May 26, 2015

(54) INK COMPOSITION AND METHOD FOR INK JET RECORDING

(71) Applicant: Seiko Epson Corporation, Tokyo (JP)

(72) Inventor: Masahiro Yatake, Shiojiri (JP)

(73) Assignee: Seiko Epson Corporation, Suwa-shi (JP)

( * ) Notice: Subject to any disclaimer, the term of this patent is extended or adjusted under 35 U.S.C. 154(b) by 0 days.

(21) Appl. No.: 14/087,544

(22) Filed: Nov. 22, 2013

(65) Prior Publication Data

US 2014/0362136 A1 Dec. 11, 2014

(30) Foreign Application Priority Data

Nov. 26, 2012 (JP) .................. 2012-257163
Mar. 25, 2013 (JP) .................. 2013-061962
Jun. 7, 2013 (JP) .................. 2013-120493

(51) Int. Cl.
*B41J 2/015* (2006.01)
*C09D 11/30* (2014.01)
*B41J 2/01* (2006.01)
*B41J 2/21* (2006.01)

(52) U.S. Cl.
CPC . *C09D 11/30* (2013.01); *B41J 2/01* (2013.01); *B41J 2/2107* (2013.01)

(58) Field of Classification Search
USPC ..................... 347/20, 95, 100–102
See application file for complete search history.

(56) References Cited

U.S. PATENT DOCUMENTS

| | | | |
|---|---|---|---|
| 5,814,685 A * | 9/1998 | Satake et al. .................. | 523/201 |
| 5,997,136 A * | 12/1999 | Fujisawa et al. .............. | 347/101 |
| 2004/0131855 A1 | 7/2004 | Ganapathiappan | |
| 2005/0174408 A1 | 8/2005 | Qingguo et al. | |
| 2011/0318551 A1 | 12/2011 | Nakagawa | |
| 2012/0038719 A1 | 2/2012 | Shimizu et al. | |
| 2012/0050388 A1 | 3/2012 | Nishiguchi et al. | |

FOREIGN PATENT DOCUMENTS

| | | |
|---|---|---|
| JP | 2002-012802 A | 1/2002 |
| JP | 2004-211089 A | 7/2004 |
| JP | 2005-219483 A | 8/2005 |
| JP | 2006-045304 A | 2/2006 |
| JP | 2012-025947 A | 2/2012 |
| JP | 2012-051309 A | 3/2012 |
| JP | 2012-072354 A | 4/2012 |
| JP | 2012-092224 A | 5/2012 |

* cited by examiner

*Primary Examiner* — Juanita D Jackson
(74) *Attorney, Agent, or Firm* — Nutter McClennen & Fish LLP; John J. Penny, Jr.

(57) ABSTRACT

An ink composition for ink jet recording contains a polymer particle that has a core portion and a shell portion on a surface of the core portion. The core portion has a glass transition temperature of 0° C. or less, and the shell portion has a glass transition temperature of 20° C. or more. The difference between the glass transition temperature of the core portion and that of the shell portion is 30° C. or more.

19 Claims, No Drawings

INK COMPOSITION AND METHOD FOR INK JET RECORDING

BACKGROUND

1. Technical Field

The present invention relates to an ink composition for ink jet recording and an ink jet recording method.

2. Related Art

Some known printing methods are based on ink jet recording, a technique by which images can be recorded on a recording medium by discharging fine droplets of ink from nozzles of a recording head onto the recording medium. The ink jet recording technology has greatly advanced in recent years, and such printing methods using ink jet recording are now also used in the area of high-definition image recording, previously possible only by photography or offset printing. Various proposals have been made about inks for this purpose, in particular, inks with which high-quality images can be recorded on recording media that absorb little or no ink.

Images recorded on a recording medium that absorbs little or no ink do not firmly adhere to the recording medium in some cases. An example of a way to make such images more firmly fixed is to add a resin emulsion (a fixing resin) to the ink. More recently, core-shell resin emulsions have been used to add various functions to inks while improving the fixation of images.

For example, JP-A-2002-12802 discloses the use of a core-shell particle that has a core portion made of a thermoplastic resin and a shell portion made of a three-dimensionally crosslinked resin so that recorded images can be stored well and can be erased from the recording medium as necessary for repeated use of the recording medium. JP-A-2012-25947 discloses the use of a core-shell particle that has a core portion made of an acrylic resin and a shell portion made of a polycarbonate-based urethane resin so that the ink has excellent discharge stability and storage stability and that images have excellent fastness such as resistance to abrasion and marking with pens. J-PA-2012-92224 discloses the use of a core-shell particle that has a core portion made of an acrylic resin and a shell portion made of a urethane resin so that the ink can be applied to recording media that absorb no ink, such as plastic or metal substrates, and that the ink is highly adhesive, forms good films, and is highly resistant to chemicals.

JP-A-2012-72354 discloses the use of a tri-block copolymer. Although not of a core-shell type, this copolymer imparts excellent storage stability and discharge stability to aqueous inks for ink jet recording and makes images highly resistant to abrasion. JP-A-2006-45304 and JP-A-2004-211089 disclose the use of a crosslinked polymer derived from polyfunctional monomers.

However, the core-shell particle disclosed in JP-A-2002-12802 often causes poor fixation of images because the shell portion has a crosslinked structure. The core-shell particles disclosed in JP-A-2012-25947 and JP-A-2012-92224 improve the fixation of images, but the urethane resin used in their shell portion causes the nozzles of the recording head to be unlikely to recover once clogged. The tri-block copolymer disclosed in JP-A-2012-72354 imparts good discharge stability to ink depending on what monomers the copolymer is composed of, but this copolymer also causes the nozzles of the recording head to be unlikely to recover once clogged. The crosslinked polymers disclosed in JP-A-2006-45304 and JP-A-2004-211089 often cause poor fixation of images.

SUMMARY

An advantage of an aspect of the invention is that it provides an ink composition for ink jet recording with which images resistant to abrasion can be recorded on recording media and which can be discharged from nozzles of a recording head in a stable manner. An advantage of another aspect of the invention is that it provides an ink jet recording method using such an ink composition.

The following describes some aspects or illustrative applications of the invention.

Application 1

An aspect of the ink composition for ink jet recording according to the invention contains a polymer particle. The polymer particle has a core portion and a shell portion on the surface of the core portion. The core portion has a glass transition temperature of 0° C. or less, and the shell portion has a glass transition temperature of 20° C. or more. The difference between the glass transition temperature of the core portion and that of the shell portion is 30° C. or more.

The aspect according to Application 1 is effective in preventing the polymer particle from adhering to nozzles because the shell portion is immune to the temperature changes associated with discharge of the ink and forms a stable hydrate layer around itself. As a result, the ink can be discharged from nozzles of a recording head in a stable manner.

The aspect of Application 1 also leads to improved abrasion resistance of the image on a recording medium because when the recoding medium after the image has been drawn by the ink is heated to a predetermined temperature, not only the shell portion but also the core portion is dissolved, and the surface of the image is coated mainly with the polymer that forms the core portion.

Application 2

The ink composition for ink jet recording of Application 1 can be configured so that the mass ratio c/s is in the range of 0.4 to 4, where c and s are the mass of the core portion and the shell portion, respectively, of the polymer particle and that the relation $(c/s)/\phi \geq 0.01$ is satisfied where $\phi$ is the particle diameter (nm) of the polymer particle.

Application 3

The ink compositions for ink jet recording of Applications 1 and 2 can be configured so that 80% by mass or more of all repeating units of the core portion of the polymer particle are derived from a hydrophobic monomer.

Application 4

The ink compositions for ink jet recording of Applications 1 to 3 can be configured so that 80% by mass or more of all repeating units of the shell portion of the polymer particle are derived from a hydrophilic monomer.

Application 5

The ink compositions for ink jet recording of Applications 1 to 3 can be configured so that 80% by mass or more of all repeating units of the shell portion of the polymer particle are composed of a repeating unit (A) derived from at least one selected from the group consisting of methyl (meth)acrylate and ethyl (meth)acrylate and a repeating unit (B) derived from (meth)acrylic acid.

Application 6

The ink compositions for ink jet recording of Applications 1 to 5 can be configured so that the shell portion of the polymer particle has a repeating unit (C) derived from at least one hydrophobic monomer selected from the group consisting of a monofunctional (meth)acrylate having an alkyl group containing 8 or more carbon atoms and a (meth)acrylate having a ring structure containing 4 or more carbon atoms.

Application 7

The ink composition for ink jet recording of Application 6 can be configured so that the ring structure is an alicyclic or heterocyclic structure.

Application 8

The ink compositions for ink jet recording of Applications 6 and 7 can be configured so that the repeating unit (C) constitutes 1% to 10% by mass of all repeating units of the shell portion of the polymer particle.

Application 9

The ink compositions for ink jet recording of Applications 6 to 8 can be configured so that the shell portion of the polymer particle further has a repeating unit (D) derived from a (meth)acrylate having a polyalkylene glycol unit.

Application 10

The ink composition for ink jet recording of Application 9 can be configured so that the repeating unit (D) constitutes 1% to 10% by mass of all repeating units of the shell portion of the polymer particle.

Application 11

The ink compositions for ink jet recording of Applications 1 to 10 can be configured so that the particle diameter of the polymer particle is in the range of 30 nm to 500 nm.

Application 12

The ink compositions for ink jet recording of Applications 1 to 11 can be configured so that the gel fraction of the polymer particle is 10% or less as measured in tetrahydrofuran.

Application 13

The ink compositions for ink jet recording of Applications 1 to 12 can be configured so that the polymer particle content is in the range of 0.5% to 20% by mass, both inclusive.

Application 14

The ink compositions for ink jet recording of Applications 1 to 13 can be configured so that the emulsifier content of the ink is 0.01% by mass or less.

Application 15

An aspect of the ink jet recording method according to the invention includes (a) discharging droplets of the ink composition for ink jet recording according to any one of Applications 1 to 14 from a recording head onto a recording medium and (b) heating the recording medium.

DESCRIPTION OF EXEMPLARY EMBODIMENTS

The following describes some preferred embodiments of the invention. These embodiments are for illustrative purposes only and should not be construed as limiting the scope of the invention. The invention includes all modifications that can be implemented without departing from the gist thereof. The term (meth)acrylic, as used herein, includes both acrylic and methacrylic compounds, and (meth)acrylate includes both an acrylate and the corresponding methacrylate.

1. INK COMPOSITION FOR INK JET RECORDING

An ink composition for ink jet recording according to this embodiment contains a polymer particle. The polymer particle has a core portion and a shell portion on the surface of the core portion. The core portion has a glass transition temperature of 0° C. or less, and the shell portion has a glass transition temperature of 20° C. or more. The difference between the glass transition temperature of the core portion and that of the shell portion is 30° C. or more. The following describes the polymer particle contained in the ink composition for ink jet recording according to this embodiment and then mentions additives.

1.1. Polymer Particle

The polymer particle contained in the ink composition for ink jet recording according to this embodiment is a core-shell polymer particle, which has a core portion and a shell portion on the surface of the core portion.

The glass transition temperature (hereinafter also referred to as $T_g$) of the core portion of the polymer particle is 0° C. or less, preferably −30° C. to 0° C., both inclusive. When the $T_g$ of the core portion is in this range, treatment such as heating makes the core portion dissolve simultaneously with the shell portion and form a coating on the image recorded on a recording medium. As a result, the abrasion resistance of the image on the recording medium is improved.

Preferably, the core portion is a polymer that has repeating units derived from a hydrophobic polymer. The use of a hydrophobic core portion enhances the abrasion resistance of the image recorded on a recording medium because the core portion forms a hydrophobic coating on the surface of the image after treatment such as heating. It is therefore preferred that 80% by mass or more, more preferably 90% by mass or more, of all repeating units of the core portion are derived from a hydrophobic monomer. The term hydrophobic monomer, as used herein, refers to a monomer the solubility of which is less than 0.3 g per 100 mL water (20° C.).

Examples of such hydrophobic monomers include the following: monofunctional (meth)acrylates that have an alkyl group containing 3 or more carbon atoms such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, and behenyl (meth)acrylate; (meth)acrylates that have a ring structure such as cyclohexyl (meth)acrylate, dicyclopentanyl (meth)acrylate, dicyclopentenyl (meth)acrylate, dicyclopentenyloxyethyl (meth)acrylate, isobornyl (meth)acrylate, norbornyl (meth)acrylate, adamantyl (meth)acrylate, and tetrahydrofurfuryl (meth)acrylate; and aromatic vinyls such as styrene, α-methylstyrene, p-methylstyrene, vinyl toluene, chlorostyrene, and divinylbenzene. One or more of such monomers can be used.

The $T_g$ of the shell portion of the polymer particle is 20° C. or more, preferably 20° C. to 60° C., both inclusive, more preferably 25° C. to 40° C., both inclusive. The ink may occasionally be heated in preparation for discharge or as a result of radiation of heat from a platen, and the shell portion is immune to such temperature changes before or during discharge of the ink when the $T_g$ of the shell portion is in this range. As a result, the polymer particle can be discharged from a recording head without losing its core-shell structure.

Preferably, the shell portion is a polymer that has repeating units derived from a hydrophilic polymer. The use of a hydrophilic shell portion improves the dispersion stability of the polymer particle in the ink composition because the shell portion forms a hydrate layer around itself. The use of such a shell portion also ensures that the ink can be discharged from nozzles of a recording head in a stable manner because the polymer particle is effectively prevented from adhering to the nozzles. It is therefore preferred that 80% by mass or more, more preferably 90% by mass or more, in particular 95% by mass or more, of all repeating units of the shell portion are derived from a hydrophilic monomer. The term hydrophilic monomer, as used herein, refers to a monomer the solubility of which is 0.3 g or more per 100 mL water (20° C.).

Examples of such hydrophilic monomers include the following: (meth)acrylates such as methyl (meth)acrylate, ethyl (meth)acrylate, α-hydroxymethyl (meth)acrylate, 2-hydroxyethyl (meth)acrylate, (poly)ethylene glycol (meth)acrylate, methoxy (poly)ethylene glycol (meth)acrylate, ethoxy (poly)ethylene glycol (meth)acrylate, and (poly)propylene glycol (meth)acrylate; (meth)acrylamides and their N-substituted derivatives such as (meth)acrylamide, N-hydroxymethyl (meth)acrylamide, diacetone acrylamide, and N,N-dimethylacryl(meth)amide; and unsaturated carboxylic acids such as acrylic acid, methacrylic acid, crotonic acid, maleic acid, fumaric acid, and itaconic acid. One or more of such monomers can be used.

The surface acid value of the shell portion is preferably in the range of 20 to 400 mg KOH/g, more preferably 30 to 250 mg KOH/g, in particular 40 to 120 mg KOH/g. The use of the shell portion with the acid value in this range provides good dispersion stability of the polymer particle in the ink, and also ensures good discharge stability of the ink because the viscosity of the ink remains not too high. The surface acid value of the shell portion can be determined by measuring the conductivity of an aqueous dispersion of the polymer particle while adding potassium hydroxide solution dropwise.

The difference between the $T_g$ of the core portion and that of the shell portion is 30° C. or more, preferably 30° C. to 65° C., both inclusive. When the difference in $T_g$ between the core portion and the shell portion is in this range, both the discharge stability of the ink and the abrasion resistance of the image on a recording medium are improved. When the difference between the $T_g$ of the core portion and that of the shell portion is less than 30° C., the abrasion resistance of the image may be affected.

Preferably, the shell portion is a polymer that has repeating units derived from a (meth)acrylate and an unsaturated carboxylic acid. This is because in such a case the carboxy groups on the surface of the shell portion help to ensure that the $T_g$ and the acid value of this portion are in their respective preferred ranges specified above. More specifically, it is preferred that 80% by mass or more, more preferably 90% by mass or more, in particular 95% by mass or more, of all repeating units of the shell portion are derived from a (meth)acrylate or an unsaturated carboxylic acid.

Examples of preferred (meth)acrylates include methyl (meth)acrylate and ethyl (meth)acrylate. Examples of preferred unsaturated carboxylic acids include (meth)acrylic acid. It is therefore preferred that the repeating units of the shell portion include a repeating unit (A) derived from at least one selected from the group consisting of methyl (meth)acrylate and ethyl (meth)acrylate and a repeating unit (B) derived from (meth)acrylic acid.

It is also preferred that the shell portion, which has a $T_g$ of 20° C. or more, is a polymer that has a repeating unit (C) derived from at least one hydrophobic monomer selected from the group consisting of a monofunctional (meth)acrylate having an alkyl group containing 8 or more carbon atoms and a (meth)acrylate having a ring structure containing 4 or more carbon atoms. When the shell portion is a polymer that has the repeating unit (C), steric repulsion is induced and enhances the dispersion stability of the polymer particle, and the hydrophobicity imparted to the shell portion ensures excellent dispersion stability of the polymer particle even when the ink is low-moisture one, i.e., an ink with a water content of 60% by mass or less.

Incidentally, while ink is discharged through nozzles, water contained in the ink evaporates near the nozzles and the organic solvent content of the ink increases, occasionally causing defects such as clogging and poor alignment of ink droplets. An example of a way to prevent such defects is to perform the treatment called flushing on a regular basis to maintain sufficient discharge stability. However, printing using a line head or on a large recording medium (e.g., larger than the A3 paper size) using a serial head is more likely to suffer from such discharge defects than printing on a smaller recording medium (e.g., A3 or smaller) using a serial-printing head because it takes a longer time to return the recording medium and flush the printer. Furthermore, even printing on a relatively small recording medium using a serial head often suffers from such discharge defects when the ink jet recording apparatus has a drying means as described later herein.

With an ink jet ink that contains a polymer having a shell portion with a $T_g$ of 20° C. or more and containing the repeating unit (C), therefore, such discharge defects are unlikely to occur regardless of which printing process is chosen, i.e., printing using a line head, printing on a large recording medium using a serial head, or printing using an ink jet recording apparatus having a drying means. Furthermore, such an ink has excellent discharge stability not only in continuous printing but also in intermittent printing, i.e., printing a small number of pages several times.

Examples of monofunctional (meth)acrylates that have an alkyl group containing 8 or more carbon atoms include 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, and behenyl (meth) acrylate. Among such monofunctional (meth)acrylates having an alkyl group containing 8 or more carbon atoms, those having an alkyl group containing 12 or more carbon atoms are particularly preferred, including lauryl (meth)acrylate, stearyl (meth)acrylate, cetyl (meth)acrylate, and behenyl (meth)acrylate.

Examples of (meth)acrylates that have a ring structure containing 4 or more carbon atoms include cyclohexyl (meth) acrylate, dicyclopentanyl (meth)acrylate, dicyclopentenyl (meth)acrylate, dicyclopentenyloxyethyl (meth)acrylate, isobornyl (meth)acrylate, norbornyl (meth)acrylate, adamantyl (meth)acrylate, and tetrahydrofurfuryl acrylate. When such a (meth)acrylate having a ring structure containing 4 or more carbon atoms is used, the "ring structure" is preferably an alicyclic or heterocyclic structure. Among such (meth) acrylates having a ring structure containing 4 or more carbon atoms, alicyclic ones having an alicyclic structure containing 8 or more carbon atoms are particularly preferred, including isobornyl (meth)acrylate, norbornyl (meth)acrylate, and adamantyl (meth)acrylate.

The percentage of the recording unit (C) out of all repeating units of the shell portion is not limited as long as the $T_g$ of the shell portion is 20° C. or more. It can be in the range of 1% to 10% by mass, for example, and is preferably selected so that the $T_g$ and the acid value of the shell portion are in their respective preferred ranges specified above.

Furthermore, it is preferred that the shell portion, which has a $T_g$ of 20° C. or more, is a polymer that has, in addition to the repeating unit (C), a repeating unit (D) derived from a hydrophilic (meth)acrylate monomer that has a polyalkylene glycol unit. When the shell portion is such a polymer, steric repulsion is induced and enhances the dispersion stability of the polymer particle, and the hydrophilicity imparted to the shell portion makes the polymer particle suitable for use in aqueous inks.

Such a (meth)acrylate having a polyalkylene glycol unit is preferably a (meth)acrylate that contains at least one of a polyethylene glycol unit and a polypropylene glycol unit because with such a (meth)acrylate the shell portion imparts excellent dispersion stability to the polymer particle.

Every appropriate polyalkylene glycol unit can be used to achieve the desired characteristics of the shell portion such as hydrophilicity. An example of a preferred polyalkylene glycol unit is one that has a (number-average) molecular weight of 100 to 1000, more preferably 400 to 1000. The use of a polyalkylene glycol unit with the degree of polymerization in this range leads to excellent dispersion stability of the polymer particle and thus provides excellent discharge stability of the ink, particularly in intermittent printing.

Specific examples of (meth)acrylates that contain a polyalkylene glycol unit include triethylene glycol (meth)acrylate, tetraethylene glycol (meth)acrylate, polyethylene glycol (meth)acrylates whose polyethylene glycol unit has a number-average molecular weight of 200 to 1000, polypropylene glycol (meth)acrylates whose polypropylene glycol unit has a number-average molecular weight of 100 to 1000, methoxy triethylene glycol (meth)acrylate, methoxy tetraethylene glycol (meth)acrylate, methoxy polyethylene glycol (meth)acrylates whose polyethylene glycol unit has a number-average molecular weight of 200 to 1000, ethoxy triethylene glycol (meth)acrylate, ethoxy tetraethylene glycol (meth)acrylate, and ethoxy polyethylene glycol (meth)acrylates whose polyethylene glycol unit has a number-average molecular weight of 200 to 1000. In particular, the following are preferred: polyethylene glycol (meth)acrylates whose polyethylene glycol unit has a number-average molecular weight of 400 to 1000, methoxy polyethylene glycol (meth)acrylates whose polyethylene glycol unit has a number-average molecular weight of 400 to 1000, and ethoxy polyethylene glycol (meth) acrylates whose polyethylene glycol unit has a number-average molecular weight of 400 to 1000.

The percentage of the recording unit (D) out of all repeating units of the shell portion is not limited as long as the $T_g$ of the shell portion is 20° C. or more. It can be in the range of 1% to 10% by mass, for example, and is preferably selected so that the $T_g$ and the acid value of the shell portion are in their respective preferred ranges specified above. Since (meth) acrylates that contain a polyalkylene glycol unit are hydrophilic monomers, it is preferred that 80% by mass or more, more preferably 90% by mass or more, of all repeating units of the shell portion are ones derived from a hydrophilic monomer, including the repeating unit (D).

As a result, a preferred configuration of the polymer particle contained in the ink composition for ink jet recording according to this embodiment is as follows: the glass transition temperature of its core portion is 0° C. or less, the glass transition temperature of its shell portion is 20° C. or more, the difference between the glass transition temperature of the core portion and that of the shell portion is 30° C. or more, and the repeating units of the shell portion include the repeating unit (C). The use of such a polymer particle provides good abrasion resistance of the image recorded on a recording medium and, particularly in intermittent printing, enhanced discharge stability of the ink.

A more preferred configuration of the polymer particle contained in the ink composition for ink jet recording according to this embodiment is as follows: the glass transition temperature of its core portion is 0° C. or less, the glass transition temperature of its shell portion is 20° C. or more, the difference between the glass transition temperature of the core portion and that of the shell portion is 30° C. or more, and the repeating units of the shell portion include the repeating units (C) and (D). The use of such a polymer particle provides, in addition to the advantages of the above preferred configuration, enhanced discharge stability of aqueous ink jet inks owing to the repeating unit (D) as a repeating unit of the shell portion.

An even more preferred configuration of the polymer particle contained in the ink composition for ink jet recording according to this embodiment is as follows: the glass transition temperature of its core portion is 0° C. or less, the glass transition temperature of its shell portion is 20° C. or more, the difference between the glass transition temperature of the core portion and that of the shell portion is 30° C. or more, and the repeating units of the shell portion include the repeating units (A), (B), and (C), preferably the repeating units (A), (B), (C), and (D). The use of such a polymer particle, in addition to providing the advantages of the above preferred configurations, helps to ensure that the $T_g$ and the acid value of the shell portion are in their respective preferred ranges specified above, owing to the repeating units (A) and (B) as repeating units of the shell portion.

The particle diameter (φ) of the polymer particle is preferably in the range of 30 nm to 500 nm, more preferably 30 nm to 200 nm, in particular 30 nm to 150 nm. The use of the polymer particle with the particle diameter in this range provides good dispersion stability of the polymer particle in the ink and makes it easier to impart gloss to the image on a recording medium. The particle diameter (φ) of the polymer particle is the volume-based average particle diameter, which can be determined by various methods such as dynamic light scattering or observation under a transmission electron microscope. The measurements in the Examples herein below were obtained by laser diffraction/scattering (the Microtrac method), an analytical method based on light scattering.

The ratio c/s, where c and s are the mass of the core portion and the shell portion, respectively, of the polymer particle, is preferably in the range of 0.4 to 4.0, more preferably 0.5 to 2.5, in particular 0.6 to 2.0. Furthermore, the use of a polymer particle that satisfies the relation (c/s)/φ≥0.01 generally improves both the discharge stability of the ink and the abrasion resistance of the image on a recording medium regardless of the size of the polymer particle, because of the good balance between the mass of the core portion and that of the shell portion.

Preferably, the polymers constituting the core portion and the shell portion of the polymer particle are not crosslinked; the use of a crosslinked core or shell portion generally affects the discharge stability of the ink.

The degree of crosslinking of a polymer can be determined by, for example, measuring the gel fraction of the polymer in tetrahydrofuran (THF) (hereinafter also referred to as the THF gel fraction). The gel fraction of the polymer particle is preferably 10% or less, more preferably 5% or less, so that the abrasion resistance of the image on a recording medium can be improved.

The THF gel fraction of the polymer particle can be measured in the following way, for example. About 10 g of the core-shell polymer particle is weighed on a Teflon (registered trademark) dish and dried at 120° C. for 1 hour. The obtained film is immersed in THF at 20° C. for 24 hours, and the solution is filtered through a 100-mesh filter. After the film is dried at 20° C. for another 24 hours, the THF gel fraction (%) is determined using the following equation:

THF gel fraction (%)=(the mass after the second drying period/the initial mass)×100.

The amount of the polymer particle in the ink composition for ink jet recording according to this embodiment (based on the solid content) is preferably in the range of 0.5% to 20% by mass, both inclusive, more preferably 0.6% to 15% by mass, both inclusive, in particular, 0.7% to 10% by mass, both inclusive.

The core-shell polymer particle mentioned herein does not necessarily have a clear boundary between its core portion and shell portion; what is required is that the polymer that forms the core portion be localized in the core portion and the polymer that forms the shell portion be localized in the shell portion. This means that the polymer localized in the core portion and that localized in the shell portion have different physical properties, thereby providing the intended advantages of the polymer particle.

The polymer particle contained in the ink composition for ink jet recording according to this embodiment can be synthesized by any method as long as the particle is configured as described above. For example, some known emulsion polymerization processes and appropriate combinations thereof are easy ways to synthesize such a polymer particle. Specific examples include batch polymerization by mixing all of the monomer at once, dropwise addition of the monomer or its pre-emulsion, seeded emulsion polymerization, multiple emulsion polymerization (e.g., two-step emulsion polymerization), and reverse-phase emulsion polymerization. The following is an example of a method for synthesizing the polymer particle.

First, a core particle is synthesized by an ordinary emulsion polymerization process using an aqueous medium. The conditions of the emulsion polymerization can be according to known methods. For example, the amount of water is usually in the range of 100 to 500 parts when the total amount of the monomer is defined as 100 parts, the polymerization temperature can be in the range of −10° C. to 100° C. (preferably −5° C. to 100° C., more preferably 0° C. to 90° C.), and the polymerization period can be in the range of 0.1 to 30 hours (preferably 2 to 25 hours). Examples of emulsion polymerization schemes that can be used include batch polymerization (feeding all of the monomer at once), feeding the monomer intermittently or continuously, feeding a pre-emulsion of the monomer intermittently or continuously, and a sequence of some of these schemes. If necessary, one or two or more agents for conventional emulsion polymerization processes can be used, including polymerization initiators, molecular weight regulators, and emulsifiers.

Examples of polymerization initiators that can be used include the following: persulfates such as potassium persulfate and ammonium persulfate; organic peroxides such as diisopropyl peroxydicarbonate, benzoyl peroxide, lauroyl peroxide, and tert-butyl peroxy-2-ethylhexanoate; azo compounds such as azobisisobutyronitrile, dimethyl 2,2'-azobisisobutyrate, and 2-carbamoyl azaisobutyronitrile; and redox systems as combinations of a radical emulsifier containing a radical emulsifying compound having a peroxide group, sodium hydrogen sulfite, and a reducing agent such as ferrous sulfate.

Examples of molecular weight regulators that can be used include the following: mercaptans such as n-hexyl mercaptan, n-octyl mercaptan, n-dodecyl mercaptan, t-dodecyl mercaptan, n-hexadecyl mercaptan, n-tetradecyl mercaptan, t-tetradecyl mercaptan, and thioglycolic acid; xanthogen disulfides such as dimethylxanthogen disulfide, diethylxanthogen disulfide, and diisopropylxanthogen disulfide; thiuram disulfides such as tetramethylthiuram disulfide, tetraethylthiuram disulfide, and tetrabutylthiuram disulfide; halogenated hydrocarbons such as chloroform, carbon tetrachloride, carbon tetrabromide, and ethylene bromide; hydrocarbons such as pentaphenylethane and α-methylstyrene dimer; and acrolein, methacrolein, allyl alcohol, 2-ethylhexyl thioglycolate, terpinolene, α-terpinene, γ-terpinene, dipentene, and 1,1-diphenylethylene. One or more of such molecular weight regulators can be used.

Examples of emulsifiers that can be used include the following: anionic surfactants such as alkyl sulfate salts and alkylbenzene sulfonate salts; nonionic surfactants such as alkyl esters of polyethylene glycol, alkyl ethers of polyethylene glycol, and alkyl phenyl ethers of polyethylene glycol; reactive emulsifiers that contain a hydrophilic group, a hydrophobic group, and a radical-reactive group; and polymeric emulsifiers obtained by introducing a hydrophilic group into polymers such as vinyl polymers and polyesters. One or more of such emulsifiers can be used. Hydrophilic groups are atomic groups that have high affinity for water and include nitro, hydroxy, amino, carboxy, and sulfonic acid, among others. Hydrophobic groups are atomic groups that have lower affinity for water than hydrophilic ones and include linear or branched alkyl, alicyclic, aromatic, alkyl silyl, and perfluoroalkyl, among others.

Then in the presence of the obtained core particle (core portion), the monomer for the shell portion is polymerized. More specifically, the monomer for the shell portion is polymerized using the core particle as the seed particle, forming a core-shell polymer particle. This can be done by, for example, adding the monomer for the shell portion or its pre-emulsion dropwise to an aqueous dispersion of the core particle all at once, intermittently, or continuously. The amount of the core particle is preferably in the range of 25 to 250 parts by mass based on 100 parts by mass of the monomer for the shell portion. Agents such as polymerization initiators, molecular weight regulators, and emulsifiers can be used during the polymerization process, and examples of agents that can be used in each category are similar to those that can be used during the production of the core particle. Examples of conditions such as the polymerization period are also similar to those for the production of the core particle.

The emulsifier content of the ink composition according to this embodiment containing the polymer particle is preferably 0.01% by mass or less; this reduces the aggregation of ink components at the interfaces around the ink (e.g., the gas-liquid interface between the air and the ink and the solid-liquid interface the ink and any member that touches the ink, such as the container of the ink), ensuring excellent storage stability of the ink.

When the emulsifier content of the ink composition according to this embodiment containing the polymer particle is 0.01% by mass or less, furthermore, the ink has both excellent foaming and anti-foaming properties and is suitable for use with an ink container that has an inlet opening through which the container can be filled with ink. The ink container that has an inlet port through which the container can be filled with ink is herein defined as an ink container that has a detachable or closable inlet opening. Although such a container allows the user to inject ink with ease, it also often causes ink to foam while being injected. The area of such an inlet opening is preferably 20 mm² or more; this makes it easy to fill the container with ink. Examples of publications that disclose such an ink container include JP-A-2005-219483 and JP-A-2012-51309.

Various methods are available to limit the emulsion content of the ink composition for ink jet recording to 0.01% by mass or less, such as multiple emulsion polymerization (e.g., two-step emulsion polymerization). The following describes an example of a multiple emulsion polymerization process that can be used.

First, the shell portion is synthesized. More specifically, a pre-emulsion that contains a hydrophilic monomer such as those listed above is prepared using a reactive emulsifier, and this pre-emulsion is added dropwise to an aqueous medium along with a polymerization initiator. Then polymerization reaction is initiated to synthesize the shell portion.

Subsequently, the core portion is formed by polymerization using the shell portion as the site of polymerization, synthesizing the polymer particle used in this embodiment. More specifically, a monomer mixture that contains a hydrophobic monomer such as those listed above is added dropwise to the aqueous dispersion medium containing the shell portion, and the monomer is polymerized to form the core portion which completes the polymer particle. The use of the shell portion as the site of polymerization eliminates the need for adding an emulsifier to the monomer mixture and thus allows the mixture to be added in the form of monomer oil droplets. Such a multiple emulsion polymerization process, in which the shell portion is synthesized using a reactive emulsifier and the core portion can be synthesized without using emulsifiers, is an easy way to limit the emulsifier content of the ink composition to 0.01% by mass or less.

Even when a large amount of emulsifier is used to synthesize the polymer particle, it is possible to limit the emulsifier content of the ink composition to 0.01% by mass or less by removing the excess of the emulsifier after the synthesis of the polymer particle.

Finally, the dispersion is neutralized with a base such as sodium hydroxide, potassium hydroxide, or ammonia until the pH is in the range of 8 to 8.5. The neutralized dispersion may be filtered if necessary. In this way, a dispersion that contains a core-shell polymer particle is obtained.

1.2. Additives

1.2.1. Coloring Material

The ink composition for ink jet recording according to this embodiment can contain a coloring material selected from a pigment or a dye.

I. Pigment

Pigments, a category of coloring materials, are insoluble or sparingly soluble in water, and they are unlikely to fade even when exposed to external stimuli such as light and gases. Recordings made using pigment inks therefore have good resistance to water, gases, and light and good storage stability. Both inorganic and organic pigments can be used. In particular, it is preferred to use at least carbon black, which is a kind of inorganic pigment, or an organic pigment since these pigments have good color developability and their low specific gravity makes them unlikely to settle when dispersed.

Examples of suitable inorganic pigments include, but are not limited to, carbon black, iron oxide, and titanium oxide.

Examples of suitable carbon blacks include, but are not limited to, furnace black, lamp black, acetylene black, and channel black (C.I. Pigment Black 7). Examples of commercially available carbon blacks include the following: No. 2300, 900, MCF88, No. 20B, No. 33, No. 40, No. 45, No. 52, MA7, MA8, MA77, MA100, and No. 2200B (trade names, Mitsubishi Chemical Corporation); COLOUR BLACK FW 1, FW 2, FW 2V, FW 18, FW 200, S 150, S 160, and S 170, PRINTEX 35, U, V, and 140 U, and SPECIAL BLACK 6, 5, 4A, 4, and 250 (trade names, Degussa AG); Conductex SC and Raven 1255, 5750, 5250, 5000, 3500, 1255, and 700 (trade names, Columbian Carbon Japan Ltd. or Columbian Chemicals); REGAL 400R, 330R, and 660R, MOGUL L, MONARCH 700, 800, 880, 900, 1000, 1100, 1300, and 1400, and ELFTEX 12 (trade names, Cabot Corporation).

Examples of suitable organic pigments include, but are not limited to, quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. Specific examples of suitable organic pigments include the following.

Examples of pigments for cyan inks include C.I. Pigment Blue 1, 2, 3, 15, 15:1, 15:2, 15:3, 15:4, 15:6, 15:34, 16, 18, 22, 60, 65, and 66 and C.I. Vat Blue 4 and 60.

Examples of pigments for magenta inks include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264 and C.I. Pigment Violet 19, 23, 32, 33, 36, 38, 43, and 50.

Examples of pigments for yellow inks include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

As for inks of other colors such as green or orange inks, well-known and commonly used pigments for such inks can be used.

It is possible to use one or a combination of two or more pigments.

II. Dye

Examples of dyes that can be used as coloring material include, but are not limited to, acid dyes, direct dyes, reactive dyes, and basic dyes. Specific examples of suitable dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. It is possible to use one or a combination of two or more dyes.

The coloring material content of the ink composition for ink jet recording according to this embodiment is preferably in the range of 1% to 7% by mass based on the total mass (100% by mass) of the ink.

1.2.2. Water-Soluble Solvent

The ink composition for ink jet recording according to this embodiment can contain a water-soluble solvent. Alkanediols, glycols, and glycol ethers are preferred for use as such a water-soluble solvent because of their boiling point, vapor pressure at the heating temperature, and safety.

Examples of suitable alkanediols include, but are not limited to, 1,2-hexanediol, 1,4-butanediol, 1,5-pentanediol, 1,6-hexanediol, and 1,7-heptanediol.

Examples of suitable glycols include, but are not limited to, ethylene glycol, propylene glycol, and diethylene glycol.

Examples of suitable glycol ethers include, but are not limited to, polyalkylene glycols such as diethylene glycol, dipropylene glycol, and dibutylene glycol. Polyalkylene glycols include alkylene glycol monoethers, such as ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether. Polyalkylene glycols also include alkylene glycol diethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

The water-soluble solvent content of the ink composition for ink jet recording according to this embodiment is preferably in the range of 1% to 30% by mass based on the total mass (100% by mass) of the ink.

1.2.3. Aprotic Polar Solvent

The ink composition for ink jet recording according to this embodiment can contain an aprotic polar solvent. An aprotic polar solvent makes the polymer particle contained in the ink dissolve when the ink is heated, effectively improving the fixation of the image to the recording medium.

It is preferred to use one or more aprotic polar solvents including, but not limited to, pyrrolidones, lactones, sulfoxides, imidazolidinones, pyrrolidinones, sulfolanes, urea derivatives, dialkylamides, cyclic ethers, and amide ethers. Specific examples of suitable pyrrolidones include 2-pyrrolidone, N-methyl-2-pyrrolidone, and N-ethyl-2-pyrrolidone. Specific examples of suitable lactones include γ-butyrolactone, γ-valerolactone, and ε-caprolactone. Specific examples of suitable sulfoxides include dimethyl sulfoxide and tetramethylene sulfoxide. Specific examples of suitable imidazolidinones include 1,3-dimethyl-2-imidazolidinone. Specific examples of suitable pyrrolidinones include 2-pyrrolidinone, N-methyl-2-pyrrolidinone, and N-phenyl-2-pyrrolidinone. Specific examples of suitable sulfolanes include sulfolane and dimethyl sulfolane. Specific examples of suitable urea derivatives include dimethylurea and 1,1,3,3-tetramethylurea. Specific examples of suitable dialkylamides include dimethylformamide and dimethylacetamide. Specific examples of suitable cyclic ethers include 1,4-dioxane and tetrahydrofuran.

As for amide ethers, suitable ones include solvents represented by general formula (1).

[Chemical Formula 1]

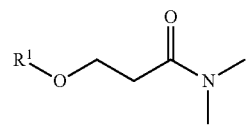

(1)

In formula (1), $R^1$ is preferably an alkyl group that contains 1 to 4 carbon atoms. The alkyl group that contains 1 to 4 carbon atoms includes linear and branched alkyl groups and can be a methyl group, an ethyl group, an n-propyl group, an isopropyl group, an n-butyl group, an isobutyl group, a sec-butyl group, or a tert-butyl group, for example. Solvents represented by formula (1) give the ink composition adequate pseudoplasticity, thereby ensuring good discharge stability of the ink, when their $R^1$ is an alkyl group that contains 1 to 4 carbon atoms. The solvents of formula (1) with an alkyl group that contains 1 to 4 carbon atoms in $R^1$ are also preferred because they are particularly good solvents for resins.

In particular, pyrrolidones, pyrrolidinones, lactones, sulfoxides, and amide ethers provide excellent fixation of the image to the recording medium. It is therefore preferred to use one or more selected from such classes of aprotic polar solvents.

Aprotic polar solvents having a boiling point of 200° C. to 260° C., both inclusive, are preferred.

The aprotic polar solvent content of the ink composition for ink jet recording according to this embodiment is preferably in the range of 3% to 30% by mass, more preferably 8% to 20% by mass, based on the total mass (100% by mass) of the ink.

1.2.4. Surfactant

The ink composition for ink jet recording according to this embodiment can contain a surfactant. Examples of suitable surfactants include, but are not limited to, nonionic surfactants. A nonionic surfactant makes the ink spread evenly on a recording medium. Ink jet recording using an ink that contains a nonionic surfactant therefore provides high-definition images with little ink bleed. Examples of such nonionic surfactants include, but are not limited to, acetylene glycol surfactants, silicone surfactants, polyoxyethylene alkyl ethers, polyoxypropylene alkyl ethers, polycyclic phenyl ethers, sorbitan derivatives, and fluorosurfactants. It is possible to use one or more selected from such classes of nonionic surfactants.

Surfactants can be used in any amount in the ink composition for ink jet recording according to this embodiment as long as the surfactant content is 1.5% by mass or less based on the total mass (100% by mass) of the ink.

1.2.5. Slipping Agent

The ink composition for ink jet recording according to this embodiment can contain a slipping agent. Adding a slipping agent leads to enhanced abrasion resistance of the image on a recording medium in some cases.

Examples of suitable slipping agents include, but are not limited to, binder resins and waxes such as paraffin wax and polyolefin waxes.

I. Binder Resin

In an ink jet recording process, a binder resin forms a resin coating while the recording medium is heated, and this coating firmly fixes the ink to the recording medium and enhances the abrasion resistance of the recording. Thermoplastic resins are therefore preferred for use as a binder resin. As a result of this effect, recordings made using inks that contain binder resins are particularly resistant to abrasion on recording media that absorb little or no ink.

A binder resin forms an emulsion while in the ink. Adding a binder resin in the form of an emulsion to the ink is an easy way to adjust the viscosity of the ink to within the range suitable for ink jet recording, and such a binder resin also imparts excellent storage stability and discharge stability to the ink.

The term discharge stability, as used herein, refers to the ability of ink to be discharged from nozzles always in uniform droplets without clogging the nozzles.

Examples of suitable binder resins include, but are not limited to, homopolymers or copolymers of (meth)acrylic acid, (meth)acrylates, acrylonitrile, cyanoacrylates, acrylamides, olefins, styrene, vinyl acetate, vinyl chloride, vinyl alcohol, vinyl ether, vinyl pyrrolidone, vinyl pyridine, vinyl carbazole, vinyl imidazole, and vinylidene chloride, fluorocarbon polymers, and natural resins. In particular, it is preferred to use at least a (meth)acrylic resin or a styrene-(meth) acrylic acid copolymer, more preferably at least an acrylic resin or a styrene-acrylic acid copolymer, even more preferably a styrene-acrylic acid copolymer. Such copolymers can be in any form such as a random copolymer, a block copolymer, an alternating copolymer, or a graft copolymer.

Binder resins obtained using known materials and production method and commercially available ones can both be used. Examples of commercially available binder resins include, but are not limited to, MICROGEL E-1002 and E-5002 (trade names, Nippon Paint Co., Ltd.), VONCOAT 4001 and 5454 (trade names, DIC), SAE-1014 (trade name, Zeon Corporation), SAIVINOL SK-200 (trade name, SAIDEN CHEMICAL INDUSTRY CO., LTD.), and JONCRYL 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF).

Various methods are available to prepare such a binder resin. Examples include the following preparation methods, and it is also possible to use two or more methods in combination if necessary: the monomer that forms the intended resin is mixed with a polymerization catalyst (polymerization initiator) and a dispersant, followed by polymerization (emulsion polymerization); a resin that has a hydrophilic moiety is dissolved in a water-soluble organic solvent, the obtained solution is mixed in water, and the water-soluble organic solvent is removed by distillation or any other method; the resin is dissolved in a water-insoluble organic solvent, and the obtained solution is mixed in an aqueous solution along with a dispersant.

Various dispersants can be used to disperse such a binder resin to form an emulsion. Examples include anionic surfactants such as sodium dodecylbenzene sulfonate, sodium lauryl phosphate, and ammonium polyoxyethylene alkyl ether sulfates and nonionic surfactants such as polyoxyethylene alkyl ethers, polyoxyethylene alkyl esters, polyoxyethylene sorbitan fatty acid esters, and polyoxyethylene alkyl phenyl ethers. It is possible to use one or a combination of two or more of such dispersants.

The average particle diameter of such a binder resin is preferably in the range of 5 nm to 400 nm, more preferably 20 nm to 300 nm, so that the storage stability and the discharge stability of the ink are enhanced. The average particle diameter indicated herein is the value measured by dynamic light scattering.

The binder resin content of the ink (based on the solid content) is preferably in the range of 0.5% to 5% by mass, more preferably 0.5% to 1.5% by mass, with respect to the total mass (100% by mass) of the ink. Enhanced abrasion resistance is provided when the binder resin content is in this range.

II. Paraffin Wax

Paraffin wax, when contained in the ink composition for ink jet recording according to this embodiment, imparts slipping properties to the recordings, making the ink particularly resistant to abrasion. Furthermore, paraffin wax is water-repellent and makes the recordings resistant to water.

The term paraffin wax, as used herein, refers to the "petroleum wax," or more specifically a mixture of hydrocarbons including a linear paraffinic hydrocarbon (normal paraffin, the main component) containing about 20 to 30 carbon atoms and small amounts of isoparaffins, each hydrocarbon having a weight-average molecular weight on the order of 300 to 500.

Adding paraffin wax in the form of an emulsion is an easy way to adjust the viscosity of the ink to within the range suitable for ink jet recording, and such a paraffin wax also imparts particularly good storage stability and discharge stability to the ink.

The melting point of such a paraffin wax is preferably 110° C. or less so that a stronger coating is provided to the recordings and that the abrasion resistance of the recordings is also enhanced. It is also preferred that such a paraffin wax has a melting point of 60° C. or more so that the ink does not turn sticky when the image is dried. More preferably, the melting point of such a paraffin wax is in the range of 70° C. to 95° C. so that the discharge stability of the ink is enhanced.

The average particle diameter of such a paraffin wax is preferably in the range of 5 nm to 400 nm, more preferably 50 nm to 200 nm, so that a stable emulsion can be obtained and that the storage stability and the discharge stability of the ink are enhanced. It is also possible to use a commercially available paraffin wax without modification. Examples of commercially available paraffin waxes include, but are not limited to, AQUACER 537 and 539 (trade names, BYK).

The paraffin wax content of the ink composition for ink jet recording according to this embodiment (based on the solid content) is preferably in the range of 0% to 1.5% by mass, more preferably 0.25% to 0.75% by mass, with respect to the total mass (100% by mass) of the ink.

III. Polyolefin Wax

The ink composition for ink jet recording according to this embodiment can contain a polyolefin wax, which provides particularly good abrasion resistance of the recordings. Examples of suitable polyolefin waxes include, but are not limited to, polyethylene wax and polypropylene wax, and polyethylene wax is preferred.

Polyethylene wax can be produced by, for example, polymerizing ethylene or decomposing a polyethylene for general molding applications by heating to make fractions smaller in molecular weight. The obtained polyethylene wax is oxidized to have carboxy or hydroxy groups, and the oxidized substance is then emulsified using a surfactant. In this way, polyethylene wax is obtained in the form of a highly stable aqueous emulsion.

It is also possible to use a commercially available polyolefin wax without modification. Examples of commercially available polyethylene waxes include, but are not limited to, NOPCOTE PEM-17 (trade name, SANNOPCO LIMITED), CHEMIPEARL W4005 (trade name, Mitsui Chemicals, Inc.), and AQUACER 515 and 593 (trade names, BYK).

The average particle diameter of such a polyolefin wax is preferably in the range of 5 nm to 400 nm, more preferably 50 nm to 200 nm, so that the storage stability and the discharge stability of the ink are enhanced.

The polyolefin wax content of the ink composition for ink jet recording according to this embodiment (based on the solid content) is preferably in the range of 0% to 1.5% by mass, more preferably 0.25% to 0.75% by mass, with respect to the total mass (100% by mass) of the ink.

It is preferred to use at least a polyolefin wax or paraffin wax as a slipping agent because these waxes provide particularly good abrasion resistance of the recordings.

It is also possible that the ink composition for ink jet recording according to this embodiment contains wax as a slipping agent other than polyolefin waxes or paraffin wax. Such a wax imparts slipping properties to the surface of the produced recordings, thereby making the recordings more resistant to abrasion. Waxes that form an emulsion while in the ink are preferred. Adding wax in the form of an emulsion in the ink is an easy way to adjust the viscosity of the ink to within the range suitable for ink jet recording, and such a wax also imparts particularly good storage stability and discharge stability to the ink.

1.2.6. Water

The ink composition for ink jet recording according to this embodiment can contain water. Especially when the ink is an aqueous ink, water is the main medium in the ink and, in an ink jet recording process, evaporates and disperses in the air while the recording medium is heated.

It is possible to use various kinds of water that contain the least possible amount of ionic impurities, including purified water such as ion-exchanged water, ultrafiltered water, reverse-osmosis-purified water, and distilled water as well as ultrapure water. Sterilized water obtained by techniques such as ultraviolet irradiation or the addition of hydrogen peroxide allows a pigment dispersion and inks that contain a pigment dispersion to be stored for long periods of time without molds or bacteria.

1.2.7. Other Components

In addition to the components described above, the ink composition for ink jet recording according to this embodiment can contain components such as additional organic solvents, pH-adjusting agents, preservatives or antimolds, antirusts, and chelating agents.

1.3. Method for Producing the Ink Composition for Ink Jet Recording

The ink composition for ink jet recording according to this embodiment can be obtained by mixing, in no particular order, the components (materials) described above and then removing impurities by filtration or any other technique as necessary. When the ink contains pigment, the pigment is preferably dispersed uniformly in a solvent before mixing because this makes the pigment easier to handle.

Examples of preferred methods for mixing the materials include adding the materials sequentially to a container equipped with a stirring device, such as a mechanical stirrer or a magnetic stirrer, and mixing them by stirring. Treatments such as filtration by centrifugation or through filters can be performed to purify the mixture as necessary.

2. INK JET RECORDING METHOD

An ink jet recording method according to this embodiment includes (a) discharging droplets of the ink composition for ink jet recording according to the preceding embodiment from a recording head onto a recording medium and (b) heating the recording medium.

The ink jet recording method according to this embodiment allows for stable discharge of the ink because the ink contains the core-shell polymer particle described above, which is unlikely to adhere to the nozzles of the recording head. Furthermore, heating the recording medium makes the core-shell polymer particle break and form a coating on the image recorded on the recording medium, thereby improving the abrasion resistance of the image.

2.1. Recording Medium

The ink composition for ink jet recording described above is suitable not only for use with ink-absorbent recording media but also for ink jet recording using a recording medium that absorbs little or no ink.

Examples of ink-absorbent recording media include, but are not limited to, kinds of ink jet recording paper such as plain paper, bond paper, and glossy paper. Examples of recording media that absorb little ink include kinds of printing paper such as art paper, coated paper, and matte paper. Examples of recording media that absorb no ink include, but are not limited to, plastic films not surface-treated for ink jet printing (i.e., having no ink-absorbing layer) and sheets of paper or a similar kind of substrate that has a plastic coating or is covered with an adhesive plastic film. Various materials can be used to make such a plastic coating, including polyvinyl chloride, polyethylene terephthalate, polycarbonate, polystyrene, polyurethane, polyethylene, and polypropylene.

The recording media that absorb little or no ink are herein defined as recording media that absorb 10 mL/m$^2$ or less of water in 30 msec$^{1/2}$ from the time of contact as measured by the Bristow method. The Bristow method is the most common method for rapid measurement of the amount of absorption of liquid and is endorsed by Japan Technical Association of the Pulp and Paper Industry (JAPAN TAPPI). The details of the test method can be found in Test No. 51 of JAPAN TAPPI pulp and paper testing guidelines 2000, which specifies procedures for testing paper and cardboard for liquid absorbency by the Bristow method.

2.2. Ink Jet Recording Apparatus

It is efficient to perform the operations (a) and (b) with a single apparatus. Thus, ink jet recording apparatuses that have a discharge means and a drying means are preferred.

A discharge means discharges, by the ink jet recording technology, droplets of the ink composition for ink jet recording onto the recording medium to record the image on the recording medium. Discharge means that are based on well-known and commonly used technologies can be used, including an operation that uses vibration of piezoelectric elements to discharge droplets, i.e., a recording operation based on the use of a head in which electrostrictive elements are mechanically deformed and form droplets of the ink, among others. Such a recording operation provides excellent recording results.

The ink may be heated before being discharged by such a discharge means. Heated ink is preferred because it dries quickly on the recording medium. The temperature of such a heated ink can be in the range of 40° C. to 60° C., for example. Various methods can be used to heat the ink, and examples include heating the ink directly with a heating element such as warm air or an IR heater or by heating the recording medium with a platen heater.

A drying means heats the recording medium after the image has been drawn by the ink, thereby drying the image. When a drying means heats the recording medium that holds the image, water and other components in the ink on the recording medium rapidly evaporate and disperse in the air, and the core-shell polymer particle contained in the ink forms a coating. The dried ink is fixed (adheres) firmly to the recording medium, and a high-quality image with excellent abrasion resistance is obtained in a short period of time.

The phrase "heats the recording medium" means that the temperature of the recording medium is increased to a desired temperature; this action is not limited to heating the recording medium directly.

Such a drying means can be applied along with a discharge means or after a discharge means is applied. In other words, the recording medium may be heated at any time, as long as it is heated at one or more of the following time points: before recording, during recording, and after the completion of recording. In particular, heating the recording medium before recording is preferred because this allows a high-quality image to be formed with little bleed on the recording medium, especially when the recording medium absorbs little or no ink. The temperature of the heated recording medium can be in the range of 80° C. to 120° C., for example.

Examples of ways to apply a drying means include, but are not limited to, the use of a platen heater or a warm-air mechanism provided to an ink jet recording apparatus or an incubator or any other drying mechanism connected to an ink jet recording apparatus.

When a drying means is applied, the surface of the recording medium that touches the ink can be at any temperature; the appropriate temperature varies depending on the materials used in the recording medium.

3. EXAMPLES

The following illustrates some examples and comparative examples of the invention to describe some aspects of the invention in more detail. These examples should not be construed as limiting the scope of the invention. The units of measurement "parts" and "%" in the following examples and comparative examples are all on a mass basis unless otherwise specified.

3.1. Example 1

3.1.1. Production of an Aqueous Dispersion of a Core-Shell Polymer Particle One hundred (100) parts of ion-exchanged water was put into a reaction vessel equipped with a dripper, a thermometer, a water-cooled reflux condenser, and a stirrer. While stirring, 0.2 parts of potassium persulfate as a polymerization initiator was added in a nitrogen atmosphere at 70° C. A monomer solution was prepared by mixing 7 parts of ion-exchange water with 0.05 parts of sodium lauryl sulfate, 22 parts of styrene, 50 parts of n-butyl acrylate, and 0.02 parts of t-dodecyl mercaptan. This monomer solution was added dropwise to the reaction vessel at 70° C., forming a core particle through reaction. After 2 parts of 10% ammonium persulfate solution was added under stirring, another reaction solution was prepared by mixing 30 parts of ion-exchanged water, 0.2 parts of potassium lauryl sulfate, 17 parts of methyl acrylate, 20 parts of ethyl acrylate, 30 parts of methyl methacrylate, 5 parts of acrylic acid, and 0.5 parts of t-dodecyl mercaptan. This reaction solution was added dropwise to the reaction vessel at 70° C. while stirring to initiate polymerization reaction. After the completion of polymerization, sodium hydroxide was added to adjust the pH to within the range of 8 to 8.5, and the neutralized dispersion was filtered through a 0.3-µm filter. In this way, an aqueous dispersion of a core-shell polymer particle was obtained.

The glass transition temperature $T_g$ (° C.) of the polymers that formed the core portion and the shell portion of this core-shell polymer particle was determined using a differential scanning calorimeter (DSC) that satisfied the requirements set forth in JIS K7121, or more specifically DSC6220 differential scanning calorimeter manufactured by Seiko Instruments Inc.

Furthermore, the particle diameter $\phi$ (nm) of the core-shell polymer particle was determined using Microtrac UPA (Nikkiso Co., Ltd.).

Then about 10 g of the core-shell polymer particle was weighed on a Teflon dish and dried at 120° C. for 1 hour. The obtained film was immersed in tetrahydrofuran (THF) at 20° C. for 24 hours, and the solution was filtered through a 100-mesh filter. After the film was dried at 20° C. for another 24 hours, the THF gel fraction (%) was determined using the following equation:

THF gel fraction (%)=(the mass after the second drying period/the initial mass)×100.

3.1.2. Preparation of an Ink Composition

I. Preparation of a Pigment Dispersion

A reaction vessel equipped with a stirrer, a thermometer, a reflux tube, and a dripping funnel was purged with nitrogen, 20 parts of benzyl methacrylate, 5 parts of 2-ethylhexyl methacrylate, 15 parts of butyl methacrylate, 10 parts of lauryl methacrylate, 2 parts of methacrylic acid, and 0.3 parts of t-dodecyl mercaptan were added, and the mixture was heated to 70° C. Separately prepared 150 parts of benzyl methacrylate, 15 parts of acrylic acid, 50 parts of butyl methacrylate, 1 part of t-dodecyl mercaptan, 20 parts of methyl ethyl ketone, and 1 part of azobisisobutyronitrile were put into the dripping funnel. While the content of the dripping funnel was added dropwise to the reaction vessel over 4 hours, polymerization reaction was allowed to proceed to form a dispersed polymer. Methyl ethyl ketone was then added to the reaction vessel to make a solution containing 40% dispersed polymer.

A portion of the dispersed polymer was analyzed by gel permeation chromatography (GPC) using L7100 system manufactured by Hitachi, Ltd. with THF as solvent, and the polymer was found to have a polystyrene-equivalent molecular weight of 50000. The molecular weight dispersity ($M_w/M_n$) was 3.1.

Then 40 parts of the polymer dispersion was mixed with 30 parts of CHROMOFINE BLUE C.I. Pigment Blue 15:3 (trade name, a cyan pigment available from Dainichiseika Color &

Chemicals Mfg. Co., Ltd.), 100 parts of 0.1 mol/L sodium hydroxide aqueous solution, and 30 parts of methyl ethyl ketone. The obtained mixture was homogenized by allowing the mixture to pass through Ultimizer 25005 (Sugino Machine Limited) eight times. Then 300 parts of ion-exchanged water was added, all methyl ethyl ketone and a portion of water were distilled away using a rotary evaporator, and 0.1 mol/L sodium hydroxide was added to the residue to adjust the pH to 9. The cyan pigment was further dispersed while its volume-average particle diameter was measured using a particle size analyzer until the volume-average particle diameter was 100 nm, and then the dispersion was filtered through a 3-μm membrane filter. In this way, a pigment dispersion with 20% solid content (the dispersed polymer and pigment) was obtained.

II. Preparation of an Ink Composition

The pigment dispersion and the core-shell polymer particle dispersion were put into a vessel so that the pigment and the solid derived from the polymer particle dispersion constituted 2 parts by mass and 1 part by mass, respectively. Then 6 parts by mass of 1,2-hexanediol, 19 parts by mass of 2-pyrrolidinone, 10 parts by mass of propylene glycol, 1 part by mass of a surfactant (BYK-348, trade name, manufactured by BYK), and purified water were added to make a total of 100 parts by mass. The components were mixed and stirred using a magnetic stirrer for 2 hours, and the obtained dispersion was filtered through a 5-μm PTFE membrane filter. In this way, an ink composition was obtained.

3.1.3. Evaluation Methods

I. Abrasion Resistance

PX-G930 printer (Seiko Epson Corporation) was modified so that during ink jet recording the recording medium could be heated in a controlled manner. The ink cartridge of this printer was filled with the ink composition prepared in the preceding section. Then the ink was discharged onto a sheet of A4-size PVC-coated paper with a resolution of 720 dpi (vertical) by 720 dpi (horizontal) and dried to print a full-page solid image in cyan as a sample. The ink was dried by heating the recording medium at 100° C. during the ink jet recording operation. The printed sample was left at room temperature for 16 hours.

The sample was then tested using AB-301 color fastness rubbing tester (Tester Sangyo Co., Ltd.), subjected to 50 cycles of to-and-fro rubbing under a load of 500 g (JIS P8136). The test was performed using a Canaquim No. 3 cotton shirting cloth under both dry and wet conditions. With the test specimen measuring 2 cm wide and a rubbing stroke of 12 cm, the condition of the specimen was evaluated on an 11-point scale from 0 to 10. The evaluation criteria were as follows. The results are summarized in Table 1.

10: There was no damaged or detached area.

9: Less than 1% of the stroke area was damaged or detached.

8: 1% to less than 3% of the stroke area was damaged or detached.

7: 3% to less than 5% of the stroke area was damaged or detached.

6: 5% to less than 10% of the stroke area was damaged or detached.

5: 10% to less than 20% of the stroke area was damaged or detached.

4: 20% to less than 40% of the stroke area was damaged or detached.

3: 40% to less than 60% of the stroke area was damaged or detached.

2: 60% to less than 80% of the stroke area was damaged or detached.

1: 80% to less than 100% of the stroke area was damaged or detached.

0: The entire stroke area was detached.

II. Discharge Stability

The discharge stability of the ink composition was evaluated by applying the ink in the same way as in the preparation of the printed sample, in continuous printing at a temperature of 40° C. and a relative humidity of 20%. The term discharge stability refers to the ability of ink to be discharged from nozzles always in uniform droplets without clogging the nozzles. The evaluation criteria were as follows. The results are summarized in Table 1.

A: Generally no problems. Defects such as failed discharge and poor alignment were occasionally observed, but the defects were resolved during the discharge operation.

B: Defects such as failed discharge and poor alignment occasionally occurred and were not resolved during the discharge operation. Maintenance restored the normal condition.

C: Defects such as failed discharge and poor alignment occasionally occurred and the ink was not able to be discharged normally. Maintenance did not restore the discharge function either.

3.2. Examples 2 to 11 and Comparative Examples 1 to 4

An ink composition was prepared in the same way as Example 1, except that the polymer particle dispersion was produced in accordance with a different monomer composition of the core portion and the shell portion as specified in Table 1. The prepared ink composition was evaluated in the same way as Example 1.

3.3. Evaluation Results

Table 1 summarizes the monomer composition of the core portion and the shell portion and the physical properties of the polymer particle (particle diameter ϕ, the core-to-shell mass ratio, $T_g$ of the core portion and the shell portion, and THF gel fraction) for each example and comparative example.

TABLE 1

| | Monomer | Tg (° C.) | Example 1 | Example 2 | Example 3 | Example 4 | Example 5 | Example 6 | Example 7 | Example 8 |
|---|---|---|---|---|---|---|---|---|---|---|
| Core portion | Styrene | 80 | 22 | 22 | 22 | 20 | 20 | 10 | 20 | 30 |
| | n-Butyl acrylate | −55 | 50 | 50 | 50 | 20 | 20 | 50 | 100 | 150 |
| | Lauryl methacrylate | −65 | 0 | 0 | 0 | 10 | 10 | 0 | 0 | 0 |
| | Acrylic acid | 106 | 0 | 0 | 0 | 0 | 0 | 0 | 0 | 0 |

TABLE 1-continued

| | | | | | | | | | | |
|---|---|---|---|---|---|---|---|---|---|---|
| Shell portion | Styrene | 80 | 0 | 0 | 0 | 0 | 0 | 0 | 0 | 0 |
| | n-Butyl acrylate | −55 | 0 | 0 | 0 | 0 | 0 | 0 | 0 | 0 |
| | Methyl acrylate | 10 | 17 | 12 | 10.5 | 22.5 | 17 | 10 | 10 | 10 |
| | Ethyl acrylate | −24 | 20 | 20 | 30 | 30 | 20 | 10 | 10 | 10 |
| | Methyl methacrylate | 105 | 30 | 30 | 45 | 45 | 30 | 35 | 35 | 35 |
| | Butyl acrylate | −55 | 0 | 0 | 0 | 0 | 0 | 5 | 5 | 5 |
| | Acrylic acid | 106 | 5 | 5 | 7.5 | 0 | 5 | 5 | 5 | 5 |
| | Methacrylic acid | 227 | 0 | 0 | 0 | 7.5 | 0 | 0 | 0 | 0 |
| | Hexamethylene dimethacrylate | — | 0 | 5 | 15 | 0 | 0 | 0 | 0 | 0 |
| Physical properties | Particle diameter φ (nm) | | 35 | 67 | 60 | 47 | 78 | 60 | 109 | 80 |
| | Amount of the core (% by mass) | | 50 | 50 | 40 | 32 | 41 | 48 | 65 | 73 |
| | Amount of the shell (% by mass) | | 50 | 50 | 60 | 68 | 59 | 52 | 35 | 27 |
| | Core portion $T_g$ (° C.) | | −10 | −10 | −10 | −2 | −2 | −20 | −20 | −20 |
| | Shell portion $T_g$ (° C.) | | 33 | 35 | 45 | 40 | 33 | 38 | 38 | 38 |
| | Shell $T_g$ − Core $T_g$ | | 43 | 45 | 55 | 42 | 35 | 55 | 55 | 55 |
| | Core-to-shell mass ratio (c/s) | | 1 | 1 | 0.67 | 0.48 | 0.69 | 0.92 | 1.85 | 2.77 |
| | (c/s)/φ | | 0.03 | 0.015 | 0.011 | 0.01 | 0.013 | 0.015 | 0.017 | 0.03 |
| | THF gel fraction (%) | | 0 | 5 | 10 | 0 | 0 | 0 | 0 | 0 |
| Evaluations | Discharge stability | | A | A | B | A | A | A | A | B |
| | Abrasion resistance (dry friction) | | 10 | 9 | 9 | 9 | 10 | 10 | 10 | 9 |
| | Abrasion resistance (wet friction) | | 10 | 8 | 8 | 8 | 10 | 10 | 9 | 8 |

| | Monomer | Tg (° C.) | Example 9 | Example 10 | Example 11 | Comparative Example 1 | Comparative Example 2 | Comparative Example 3 | Comparative Example 4 |
|---|---|---|---|---|---|---|---|---|---|
| Core portion | Styrene | 80 | 45 | 22 | 22 | 32 | 18 | — | 22 |
| | n-Butyl acrylate | −55 | 225 | 50 | 50 | 40 | 50 | — | 50 |
| | Lauryl methacrylate | −65 | 0 | 0 | 0 | 0 | 0 | — | 0 |
| | Acrylic acid | 106 | 0 | 0 | 0 | 0 | 5 | — | 0 |
| Shell portion | Styrene | 80 | 0 | 0 | 0 | 32 | — | 0 | 32 |
| | n-Butyl acrylate | −55 | 0 | 0 | 0 | 0 | — | 0 | 35 |
| | Methyl acrylate | 10 | 10 | 17 | 17 | 35 | — | 17 | 0 |
| | Ethyl acrylate | −24 | 10 | 20 | 20 | 0 | — | 20 | 0 |
| | Methyl methacrylate | 105 | 35 | 30 | 30 | 0 | — | 30 | 0 |
| | Butyl acrylate | −55 | 5 | 0 | 0 | 0 | — | 0 | 0 |
| | Acrylic acid | 106 | 0 | 5 | 5 | 5 | — | 5 | 5 |
| | Methacrylic acid | 227 | 5 | 0 | 0 | 0 | — | 0 | 0 |
| | Hexamethylene dimethacrylate | — | 0 | 0 | 0 | 0 | — | 0 | 0 |
| Physical properties | Particle diameter φ (nm) | | 110 | 110 | 510 | 90 | 90 | 95 | 55 |
| | Amount of the core (% by mass) | | 81 | 50 | 50 | 50 | 100 | 0 | 50 |
| | Amount of the shell (% by mass) | | 19 | 50 | 50 | 50 | 0 | 100 | 50 |
| | Core portion $T_g$ (° C.) | | −20 | −10 | −10 | 4 | −8 | — | −10 |
| | Shell portion $T_g$ (° C.) | | 38 | 33 | 33 | 34 | — | 33 | 11 |
| | Shell $T_g$ − Core $T_g$ | | 55 | 43 | 43 | 30 | — | — | 22 |
| | Core-to-shell mass ratio (c/s) | | 4.15 | 1 | 1 | 1 | — | — | 1 |
| | (c/s)/φ | | 0.038 | 0.009 | 0.002 | 0.011 | — | — | 0.018 |
| | THF gel fraction (%) | | 0 | 0 | 0 | 0 | 0 | 0 | 0 |
| Evaluations | Discharge stability | | B | B | B | B | A | C | A |
| | Abrasion resistance (dry friction) | | 8 | 8 | 8 | 6 | 4 | 6 | 6 |
| | Abrasion resistance (wet friction) | | 7 | 7 | 7 | 3 | 3 | 4 | 5 |

The ink compositions for ink jet recording according to Examples 1 to 11 were able to be discharged from nozzles of a recording head in a stable manner, and the images recorded using these inks on a recording medium were resistant to abrasion.

The ink composition for ink jet recording of Comparative Example 1 failed to provide satisfactory abrasion resistance because of the specified polymer particle; the core portion of the polymer particle had a $T_g$ exceeding 0° C.

The ink composition for ink jet recording of Comparative Example 2 failed to provide satisfactory abrasion resistance because of the specified monomer composition of the polymer particle; the polymer particle was not a core-shell particle.

The ink composition for ink jet recording of Comparative Example 3 was not able to be discharged in a stable manner and failed to provide satisfactory abrasion resistance because of the specified monomer composition of the polymer particle; the polymer particle was not a core-shell particle.

The ink composition for ink jet recording of Comparative Example 4 failed to provide satisfactory abrasion resistance because of the specified polymer particle; the difference between the $T_g$ of the core portion of the polymer particle and that of the shell portion was less than 30° C.

3.4. Examples 12 to 20 and Comparative Example 5

3.4.1. Production of an Aqueous Dispersion of a Core-Shell Polymer Particle and Preparation of an Ink Composition A polymer particle dispersion was produced and an ink composition was prepared in the same way as Example 1, except that the polymer particle dispersion was produced in accordance with a different monomer composition of the core portion and the shell portion as specified in Table 2. Example 12 and Comparative Example 5 are equivalent to Example 1 and Comparative Example 1, respectively.

3.4.2. Evaluation Methods

I. Abrasion Resistance

The abrasion resistance of the ink composition was evaluated in the same way as Example 1. The results are summarized in Table 2.

II. Discharge Stability in Continuous Printing

The discharge stability of the ink composition in continuous printing was evaluated in the same way as Example 1. The results are summarized in Table 2.

III. Discharge Stability in Intermittent Printing

The discharge stability of the ink composition was evaluated in intermittent printing at a temperature of 40° C. and a relative humidity of 20% using the same printer as in Example 1. Prior to the test it was confirmed that the ink could be normally discharged from all nozzles. After a 1-minute pause at a temperature of 40° C. and a relative humidity of 20%, one drop of the ink was discharged and observed under an optical microscope for displacement of the dot from its intended position. The evaluation criteria were as follows. The results are summarized in Table 2.

A: The dot was displaced by 10 μm or less.
B: The dot was displaced by more than 10 μm to 20 μm.
C: The dot was displaced by more than 20 μm.

3.5. Evaluation Results

Table 2 summarizes the monomer composition of the core portion and the shell portion and the physical properties of the polymer particle (particle diameter φ, the core-to-shell mass ratio, $T_g$ of the core portion and the shell portion, and THF gel fraction) for Examples 12 to 20 and Comparative Example 5.

TABLE 2

| | Monomer | Tg (° C.) | Example 12 | Example 13 | Example 14 | Example 15 | Example 16 | Example 17 | Example 18 | Example 19 | Example 20 | Comparative Example 5 |
|---|---|---|---|---|---|---|---|---|---|---|---|---|
| Core portion | Styrene | 80 | 22 | 22 | 22 | 22 | 22 | 15 | 15 | 10 | 20 | 32 |
| | n-Butyl acrylate | −55 | 50 | 50 | 50 | 50 | 50 | 57 | 57 | 38 | 80 | 40 |
| | Lauryl methacrylate | −65 | 0 | 0 | 0 | 0 | 0 | 0 | 0 | 0 | 0 | 0 |
| | Acrylic acid | 106 | 0 | 0 | 0 | 0 | 0 | 0 | 0 | 0 | 0 | 0 |
| Shell portion | Styrene | 80 | 0 | 0 | 0 | 0 | 0 | 0 | 0 | 0 | 0 | 32 |
| | Methyl acrylate | 10 | 17 | 17 | 17 | 17 | 17 | 17 | 17 | 22 | 10 | 35 |
| | Ethyl acrylate | −24 | 20 | 10 | 10 | 10 | 10 | 15 | 15 | 25 | 10 | 0 |
| | Methyl methacrylate | 105 | 30 | 30 | 30 | 30 | 30 | 30 | 30 | 30 | 20 | 0 |
| | Butyl acrylate | −55 | 0 | 0 | 0 | 0 | 0 | 0 | 0 | 10 | 0 | 0 |
| | Acrylic acid | 106 | 5 | 5 | 5 | 5 | 5 | 5 | 0 | 0 | 0 | 5 |
| | Methacrylic acid | 227 | 0 | 0 | 0 | 0 | 0 | 0 | 5 | 5 | 5 | 0 |
| | Methoxy PEG 400 acrylate (*1) | −71 | 0 | 5 | 0 | 0 | 0 | 0 | 0 | 5 | 0 | 0 |
| | Methoxy TEG acrylate (*2) | −50 | 0 | 0 | 5 | 0 | 0 | 0 | 0 | 0 | 0 | 0 |
| | Methoxy PEG 400 methacrylate (*3) | −60 | 0 | 0 | 0 | 5 | 0 | 0 | 0 | 0 | 5 | 0 |
| | Methoxy PEG 1000 methacrylate (*4) | −30 | 0 | 0 | 0 | 0 | 5 | 0 | 0 | 0 | 0 | 0 |
| | Lauryl acrylate | −3 | 0 | 0 | 5 | 0 | 0 | 5 | 0 | 0 | 0 | 0 |
| | Stearyl acrylate | −10 | 0 | 0 | 0 | 5 | 0 | 0 | 5 | 0 | 0 | 0 |
| | Cetyl acrylate | 34 | 0 | 0 | 0 | 0 | 5 | 0 | 0 | 0 | 0 | 0 |
| | Isobornyl methacrylate | 94 | 0 | 5 | 0 | 0 | 0 | 0 | 0 | 5 | 5 | 0 |
| Physical properties | Particle diameter φ (nm) | | 35 | 30 | 30 | 32 | 32 | 28 | 28 | 28 | 28 | 90 |
| | Amount of the core (% by mass) | | 50 | 50 | 50 | 50 | 50 | 50 | 50 | 32 | 65 | 50 |
| | Amount of the shell (% by mass) | | 50 | 50 | 50 | 50 | 50 | 50 | 50 | 68 | 35 | 50 |
| | Core portion $T_g$ (° C.) | | −10 | −10 | −10 | −10 | −10 | −27 | −27 | −27 | −28 | 4 |
| | Shell portion $T_g$ (° C.) | | 33 | 52 | 46 | 45 | 50 | 48 | 48 | 34 | 59 | 34 |
| | Shell $T_g$ − Core $T_g$ | | 43 | 62 | 56 | 55 | 60 | 75 | 75 | 61 | 87 | 30 |
| | Core-to-shell mass ratio (c/s) | | 1 | 1 | 1 | 1 | 1 | 1 | 1 | 2.1 | 0.54 | 1 |
| | (c/s)/φ | | 0.03 | 0.03 | 0.03 | 0.03 | 0.03 | 0.03 | 0.03 | 0.08 | 0.02 | 0.011 |
| | THF gel fraction (%) | | 0 | 0 | 0 | 0 | 0 | 0 | 0 | 0 | 0 | 0 |
| Evaluations | Discharge stability (continuous printing) | | A | A | B | A | A | A | A | A | A | B |
| | Discharge stability (intermittent printing) | | B | A | A | A | A | A | A | A | A | C |
| | Abrasion resistance (dry friction) | | 10 | 10 | 10 | 10 | 10 | 10 | 10 | 10 | 10 | 6 |
| | Abrasion resistance (wet friction) | | 10 | 10 | 10 | 10 | 10 | 9 | 9 | 10 | 10 | 3 |

(*1) Methoxy polyethylene glycol #400 acrylate (average degree of polymerization of the polyethylene glycol chain n = 9)
(*2) Methoxy triethylene glycol acrylate
(*3) Methoxy polyethylene glycol #400 methacrylate (average degree of polymerization of the polyethylene glycol chain n = 9)
(*4) Methoxy polyethylene glycol #1000 acrylate (average degree of polymerization of the polyethylene glycol chain n = 23)

The ink compositions for ink jet recording according to Examples 13 to 20 were able to be discharged from nozzles of a recording head in a stable manner both in continuous printing and intermittent printing, and the images recorded using these inks on a recording medium were resistant to abrasion.

Example 12 was found inferior to Examples 13 to 20 in intermittent printing.

The ink composition for ink jet recording of Comparative Example 5 failed to provide satisfactory abrasion resistance because of the specified polymer particle; the core portion of the polymer particle contained in it had a $T_g$ exceeding 0° C.

3.6. Examples 21 to 32

3.6.1. Production of an Aqueous Dispersion of a Core-Shell Polymer Particle and Preparation of an Ink Composition The ink compositions specified in Table 3 (Examples 21 to 31) were prepared in the same way as Example 1, except that the polymer particles according to Examples 1 to 11 were synthesized by the method described below. Example 32 is equivalent to Example 5.

The core-shell polymer particle dispersion used in Example 21 was produced in the following way. One hundred (100) parts of ion-exchanged water was put into a reaction vessel equipped with a dripper, a thermometer, a water-cooled reflux condenser, and a stirrer, and the vessel was purged with nitrogen. A monomer solution containing 0.2 parts of potassium persulfate, 17 parts of methyl acrylate, 20 parts of ethyl acrylate, 30 parts of methyl methacrylate, and 5 parts of acrylic acid was added dropwise to the vessel at 70° C. while stirring, polymerizing the monomers into the shell portion. Sodium hydroxide was added to adjust the pH to within the range of 8 to 8.5. Then the core portion was formed by polymerization with the shell portion as the site of reaction. Another monomer solution, which contained 0.2 parts of potassium persulfate, 22 parts of styrene, and 50 parts of n-butyl acrylate, was added dropwise to the vessel at 70° C., polymerizing the monomers. In this way, the core-shell polymer particle aqueous dispersion used in Example 21 was obtained.

The core-shell polymer particle aqueous dispersions used in Examples 22 to 31 were produced in the same way as that for Example 21, except that a different monomer composition of the core portion and the shell portion was used as specified in Table 3.

3.6.2. Evaluation Methods

I. Abrasion Resistance

The abrasion resistance of the ink composition was evaluated in the same way as Example 1. The results are summarized in Table 3.

II. Discharge Stability in Continuous Printing

The discharge stability of the ink composition in continuous printing was evaluated in the same way as Example 1. The results are summarized in Table 3.

III. Storage Stability

Fifty (50) grams of the ink was put into a 110-cc sample bottle, and the bottle was capped and left at 40° C. for 24 hours. Then 1 g of the ink was filtered through a 10 μm filter, and the insoluble particles (aggregates) on the filter was counted under an optical microscope. The results are summarized in Table 3.

3.7. Evaluation Results

Table 3 summarizes the monomer composition of the core portion and the shell portion and the physical properties of the polymer particle (particle diameter φ, the core-to-shell mass ratio, $T_g$ of the core portion and the shell portion, and THF gel fraction) for Examples 21 to 32.

TABLE 3

| | Monomer | Tg (° C.) | Example 21 | Example 22 | Example 23 | Example 24 | Example 25 | Example 26 | Example 27 | Example 28 | Example 29 | Example 30 | Example 31 | Example 32 |
|---|---|---|---|---|---|---|---|---|---|---|---|---|---|---|
| Core portion | Styrene | 80 | 22 | 22 | 22 | 20 | 20 | 10 | 20 | 30 | 45 | 22 | 22 | 20 |
| | n-Butyl acrylate | −55 | 50 | 50 | 50 | 20 | 20 | 50 | 100 | 150 | 225 | 50 | 50 | 20 |
| | Lauryl methacrylate | −65 | 0 | 0 | 0 | 10 | 10 | 0 | 0 | 0 | 0 | 0 | 0 | 10 |
| | Acrylic acid | 106 | 0 | 0 | 0 | 0 | 0 | 0 | 0 | 0 | 0 | 0 | 0 | 0 |
| Shell portion | Styrene | 80 | 0 | 0 | 0 | 0 | 0 | 0 | 0 | 0 | 0 | 0 | 0 | 0 |
| | n-Butyl acrylate | −55 | 0 | 0 | 0 | 0 | 0 | 0 | 0 | 0 | 0 | 0 | 0 | 0 |
| | Methyl acrylate | 10 | 17 | 12 | 10.5 | 22.5 | 17 | 10 | 10 | 10 | 10 | 17 | 17 | 17 |
| | Ethyl acrylate | −24 | 20 | 20 | 30 | 30 | 20 | 10 | 10 | 10 | 10 | 20 | 20 | 20 |
| | Methyl methacrylate | 105 | 30 | 30 | 45 | 45 | 30 | 35 | 35 | 35 | 35 | 30 | 30 | 30 |
| | Butyl acrylate | −55 | 0 | 0 | 0 | 0 | 0 | 5 | 5 | 5 | 5 | 0 | 0 | 0 |
| | Acrylic acid | 106 | 5 | 5 | 7.5 | 0 | 5 | 5 | 5 | 5 | 0 | 5 | 5 | 5 |
| | Methacrylic acid | 227 | 0 | 0 | 0 | 7.5 | 0 | 0 | 0 | 0 | 5 | 0 | 0 | 0 |
| | Hexamethylene dimethacrylate | — | 0 | 5 | 15 | 0 | 0 | 0 | 0 | 0 | 0 | 0 | 0 | 0 |
| Physical properties | Particle diameter φ (nm) | | 35 | 67 | 60 | 47 | 78 | 60 | 109 | 80 | 110 | 110 | 510 | 78 |
| | Amount of the core (% by mass) | | 50 | 50 | 40 | 32 | 41 | 48 | 65 | 73 | 81 | 50 | 50 | 41 |
| | Amount of the shell (% by mass) | | 50 | 50 | 60 | 68 | 59 | 52 | 35 | 27 | 19 | 50 | 50 | 59 |
| | Core portion $T_g$ (° C.) | | −10 | −10 | −10 | −2 | −2 | −20 | −20 | −20 | −20 | −10 | −10 | −2 |
| | Shell portion $T_g$ (° C.) | | 33 | 35 | 45 | 40 | 33 | 38 | 38 | 38 | 38 | 33 | 33 | 33 |
| | Shell $T_g$ − Core $T_g$ | | 43 | 45 | 55 | 42 | 35 | 55 | 55 | 55 | 55 | 43 | 43 | 35 |
| | Core-to-shell mass ratio (c/s) | | 1 | 1 | 0.67 | 0.48 | 0.69 | 0.92 | 1.85 | 2.77 | 4.15 | 1 | 1 | 0.69 |
| | (c/s)/φ | | 0.03 | 0.015 | 0.011 | 0.01 | 0.013 | 0.015 | 0.017 | 0.03 | 0.038 | 0.009 | 0.002 | 0.013 |
| | THF gel fraction (%) | | 0 | 5 | 10 | 0 | 0 | 0 | 0 | 0 | 0 | 0 | 0 | 0 |

TABLE 3-continued

|  | Monomer | Tg (° C.) | Example 21 | Example 22 | Example 23 | Example 24 | Example 25 | Example 26 | Example 27 | Example 28 | Example 29 | Example 30 | Example 31 | Example 32 |
|---|---|---|---|---|---|---|---|---|---|---|---|---|---|---|
| Evaluations | Discharge stability |  | A | A | B | A | A | A | A | B | B | B | B | A |
|  | Abrasion resistance (dry friction) |  | 10 | 9 | 9 | 9 | 10 | 10 | 10 | 9 | 8 | 8 | 8 | 10 |
|  | Abrasion resistance (wet friction) |  | 10 | 8 | 8 | 8 | 10 | 10 | 9 | 8 | 7 | 7 | 7 | 10 |
|  | Storage stability |  | 19 | 18 | 13 | 6 | 6 | 8 | 16 | 21 | 20 | 23 | 32 | 55 |

The ink compositions for ink jet recording according to Examples 21 to 31 had higher storage stability than that of Example 32.

3.8. Examples 33 to 42

3.8.1. Production of an Aqueous Dispersion of a Core-Shell Polymer Particle and Preparation of an Ink Composition The ink compositions specified in Table 4 (Examples 33 to 41) were prepared in the same way as Example 1, except that the polymer particles according to Examples 12 to 20 were synthesized by the method described below. Example 42 is equivalent to Example 15.

The core-shell polymer particle dispersion used in Example 33 was produced in the following way. One hundred (100) parts of ion-exchanged water was put into a reaction vessel equipped with a dripper, a thermometer, a water-cooled reflux condenser, and a stirrer, and the vessel was purged with nitrogen. A monomer solution containing 0.2 parts of potassium persulfate, 17 parts of methyl acrylate, 20 parts of ethyl acrylate, 30 parts of methyl methacrylate, and 5 parts of acrylic acid was added dropwise to the vessel at 70° C. while stirring, polymerizing the monomers into the shell portion. Sodium hydroxide was added to adjust the pH to within the range of 8 to 8.5. Then the core portion was formed by polymerization with the shell portion as the site of reaction. Another monomer solution, which contained 0.2 parts of potassium persulfate, 22 parts of styrene, and 50 parts of n-butyl acrylate, was added dropwise to the vessel at 70° C., polymerizing the monomers. In this way, the core-shell polymer particle aqueous dispersion used in Example 33 was obtained.

The core-shell polymer particle aqueous dispersions used in Examples 34 to 41 were produced in the same way as that for Example 33, except that a different monomer composition of the core portion and the shell portion was used as specified in Table 4.

3.8.2. Evaluation Methods

I. Abrasion Resistance
The abrasion resistance of the ink composition was evaluated in the same way as Example 1. The results are summarized in Table 4.

II. Discharge Stability in Continuous Printing
The discharge stability of the ink composition in continuous printing was evaluated in the same way as Example 1. The results are summarized in Table 4.

III. Discharge Stability in Intermittent Printing
The discharge stability of the ink composition in intermittent printing was evaluated in the same way as Example 12. The results are summarized in Table 4.

IV. Storage Stability
The storage stability of the ink composition was evaluated in the same way as Example 21. The results are summarized in Table 4.

3.9. Evaluation Results

Table 4 summarizes the monomer composition of the core portion and the shell portion and the physical properties of the polymer particle (particle diameter $\phi$, the core-to-shell mass ratio, $T_g$ of the core portion and the shell portion, and THF gel fraction) for Examples 33 to 42.

TABLE 4

|  | Monomer | Tg (° C.) | Example 33 | Example 34 | Example 35 | Example 36 | Example 37 | Example 38 | Example 39 | Example 40 | Example 41 | Example 42 |
|---|---|---|---|---|---|---|---|---|---|---|---|---|
| Core portion | Styrene | 80 | 22 | 22 | 22 | 22 | 22 | 15 | 15 | 10 | 20 | 22 |
|  | n-Butyl acrylate | −55 | 50 | 50 | 50 | 50 | 50 | 57 | 57 | 38 | 80 | 50 |
|  | Lauryl methacrylate | −65 | 0 | 0 | 0 | 0 | 0 | 0 | 0 | 0 | 0 | 0 |
|  | Acrylic acid | 106 | 0 | 0 | 0 | 0 | 0 | 0 | 0 | 0 | 0 | 0 |
| Shell portion | Styrene | 80 | 0 | 0 | 0 | 0 | 0 | 0 | 0 | 0 | 0 | 0 |
|  | Methyl acrylate | 10 | 17 | 17 | 17 | 17 | 17 | 17 | 17 | 22 | 10 | 17 |
|  | Ethyl acrylate | −24 | 20 | 10 | 10 | 10 | 10 | 15 | 15 | 25 | 10 | 10 |
|  | Methyl methacrylate | 105 | 30 | 30 | 30 | 30 | 30 | 30 | 30 | 30 | 20 | 30 |
|  | Butyl acrylate | −55 | 0 | 0 | 0 | 0 | 0 | 0 | 0 | 10 | 0 | 0 |
|  | Acrylic acid | 106 | 5 | 5 | 5 | 5 | 5 | 5 | 0 | 0 | 0 | 5 |
|  | Methacrylic acid | 227 | 0 | 0 | 0 | 0 | 0 | 0 | 5 | 5 | 5 | 0 |
|  | Methoxy PEG 400 acrylate (*1) | −71 | 0 | 5 | 0 | 0 | 0 | 0 | 0 | 5 | 0 | 0 |
|  | Methoxy TEG acrylate (*2) | −50 | 0 | 0 | 5 | 0 | 0 | 0 | 0 | 0 | 0 | 0 |
|  | Methoxy PEG 400 methacrylate (*3) | −60 | 0 | 0 | 0 | 5 | 0 | 0 | 0 | 0 | 5 | 5 |
|  | Methoxy PEG 1000 methacrylate (*4) | −30 | 0 | 0 | 0 | 0 | 5 | 0 | 0 | 0 | 0 | 0 |
|  | Lauryl acrylate | −3 | 0 | 0 | 5 | 0 | 0 | 5 | 0 | 0 | 0 | 0 |
|  | Stearyl acrylate | −10 | 0 | 0 | 0 | 5 | 0 | 0 | 5 | 0 | 0 | 5 |
|  | Cetyl acrylate | 34 | 0 | 0 | 0 | 0 | 5 | 0 | 0 | 0 | 0 | 0 |
|  | Isobornyl methacrylate | 94 | 0 | 5 | 0 | 0 | 0 | 0 | 0 | 5 | 5 | 0 |

TABLE 4-continued

|  | Monomer | Tg (° C.) | Example 33 | Example 34 | Example 35 | Example 36 | Example 37 | Example 38 | Example 39 | Example 40 | Example 41 | Example 42 |
|---|---|---|---|---|---|---|---|---|---|---|---|---|
| Physical properties | Particle diameter φ (nm) |  | 35 | 30 | 30 | 32 | 32 | 28 | 28 | 28 | 28 | 32 |
|  | Amount of the core (% by mass) |  | 50 | 50 | 50 | 50 | 50 | 50 | 50 | 32 | 65 | 50 |
|  | Amount of the shell (% by mass) |  | 50 | 50 | 50 | 50 | 50 | 50 | 50 | 68 | 35 | 50 |
|  | Core portion $T_g$ (° C.) |  | −10 | −10 | −10 | −10 | −10 | −27 | −27 | −27 | −28 | −10 |
|  | Shell portion $T_g$ (° C.) |  | 33 | 52 | 46 | 45 | 50 | 48 | 48 | 34 | 59 | 45 |
|  | Shell $T_g$ − Core $T_g$ |  | 43 | 62 | 56 | 55 | 60 | 75 | 75 | 61 | 87 | 55 |
|  | Core-to-shell mass ratio (c/s) |  | 1 | 1 | 1 | 1 | 1 | 1 | 1 | 2.1 | 0.54 | 1 |
|  | (c/s)/φ |  | 0.03 | 0.03 | 0.03 | 0.03 | 0.03 | 0.03 | 0.03 | 0.08 | 0.02 | 0.03 |
|  | THF gel fraction (%) |  | 0 | 0 | 0 | 0 | 0 | 0 | 0 | 0 | 0 | 0 |
| Evaluations | Discharge stability (continuous printing) |  | A | A | B | A | A | A | A | A | A | A |
|  | Discharge stability (intermittent printing) |  | B | A | A | A | A | A | A | A | A | A |
|  | Abrasion resistance (dry friction) |  | 10 | 10 | 10 | 10 | 10 | 10 | 10 | 10 | 10 | 10 |
|  | Abrasion resistance (wet friction) |  | 10 | 10 | 10 | 10 | 10 | 9 | 9 | 10 | 10 | 10 |
|  | Storage stability |  | 8 | 6 | 7 | 8 | 9 | 6 | 10 | 11 | 15 | 63 |

(*1) Methoxy polyethylene glycol #400 acrylate (average degree of polymerization of the polyethylene glycol chain n = 9)
(*2) Methoxy triethylene glycol acrylate
(*3) Methoxy polyethylene glycol #400 methacrylate (average degree of polymerization of the polyethylene glycol chain n = 9)
(*4) Methoxy polyethylene glycol #1000 acrylate (average degree of polymerization of the polyethylene glycol chain n = 23)

The ink compositions for ink jet recording according to Examples 33 to 41 had higher storage stability than that of Example 42.

The invention is not limited to the embodiments described above and can be modified in various ways. For example, the invention includes constitutions that are substantially the same as the preceding embodiments (e.g., those that have the same function, are used or made by the same method, and provide the same results or are for the same purposes and advantages). The invention also includes constitutions obtained by changing any nonessential part of the preceding embodiments. Furthermore, the invention includes constitutions that have the same operations and offer the same advantages as the preceding embodiments and constitutions that can achieve the same objects as the preceding embodiments. The invention also includes constitutions obtained by adding any known technology to the preceding embodiments.

The entire disclosure of Japanese Patent Application No. 2012-257163, filed Nov. 26, 2012 and No. 2013-061962, filed Mar. 25, 2013 and No. 2013-120493 filed Jun. 7, 2013 are expressly incorporated by reference herein.

What is claimed is:

1. An ink composition for ink jet recording comprising a polymer particle having a core portion and a shell portion on a surface of the core portion, the core portion having a glass transition temperature of 0° C. or less and the shell portion having a glass transition temperature of 20° C. or more, wherein
a difference between the glass transition temperature of the core portion and the glass transition temperature of the shell portion is 30° C. or more, wherein: a mass ratio c/s is in a range of 0.4 to 4, where c and s are a mass of the core portion and the shell portion, respectively, of the polymer particle; and
a relation (c/s)/φ≥0.01 is satisfied where φ is a particle diameter of the polymer particle in nm.

2. The ink composition for ink jet recording according to claim 1, wherein 80% by mass or more of all repeating units of the core portion of the polymer particle are derived from a hydrophobic monomer.

3. A method for ink jet recording comprising:
(a) discharging a droplet of the ink composition for ink jet recording according to claim 2 from a recording head onto a recording medium; and
(b) heating the recording medium.

4. The ink composition for ink jet recording according to claim 1, wherein 80% by mass or more of all repeating units of the shell portion of the polymer particle are derived from a hydrophilic monomer.

5. A method for ink jet recording comprising:
(a) discharging a droplet of the ink composition for ink jet recording according to claim 4 from a recording head onto a recording medium; and
(b) heating the recording medium.

6. The ink composition for ink jet recording according to claim 1, wherein 80% by mass or more of all repeating units of the shell portion of the polymer particle are composed of a repeating unit (A) derived from at least one selected from the group consisting of methyl (meth)acrylate and ethyl (meth)acrylate and a repeating unit (B) derived from (meth)acrylic acid.

7. A method for ink jet recording comprising:
(a) discharging a droplet of the ink composition for ink jet recording according to claim 6 from a recording head onto a recording medium; and
(b) heating the recording medium.

8. The ink composition for ink jet recording according to claim 1, wherein the shell portion of the polymer particle has a repeating unit (C) derived from at least one hydrophobic monomer selected from the group consisting of a monofunctional (meth)acrylate having an alkyl group containing 8 or more carbon atoms and a (meth)acrylate having a ring structure containing 4 or more carbon atoms.

9. The ink composition for ink jet recording according to claim 8, wherein the ring structure is an alicyclic or heterocyclic structure.

10. The ink composition for ink jet recording according to claim 8, wherein the repeating unit (C) constitutes 1% to 10% by mass of all repeating units of the shell portion of the polymer particle.

11. The ink composition for ink jet recording according to claim 8, wherein the shell portion of the polymer particle further has a repeating unit (D) derived from a (meth)acrylate having a polyalkylene glycol unit.

12. The ink composition for ink jet recording according to claim 11, wherein the repeating unit (D) constitutes 1% to 10% by mass of all repeating units of the shell portion of the polymer particle.

13. A method for ink jet recording comprising:
(a) discharging a droplet of the ink composition for ink jet recording according to claim 6 from a recording head onto a recording medium; and
(b) heating the recording medium.

14. The ink composition for ink jet recording according to claim 1, wherein the particle diameter of the polymer particle is in a range of 30 nm to 500 nm.

15. The ink composition for ink jet recording according to claim 1, wherein a gel fraction of the polymer particle is 10% or less as measured in tetrahydrofuran.

16. The ink composition for ink jet recording according to claim 1, wherein a polymer particle content is in a range of 0.5% to 20% by mass, both inclusive.

17. The ink composition for ink jet recording according to claim 1, wherein an emulsifier content of the ink is 0.01% by mass or less.

18. A method for ink jet recording comprising:
(a) discharging a droplet of the ink composition for ink jet recording according to claim 1 from a recording head onto a recording medium; and
(b) heating the recording medium.

19. A method for ink jet recording comprising:
(a) discharging a droplet of the ink composition for ink jet recording according to claim 1 from a recording head onto a recording medium; and
(b) heating the recording medium.

\* \* \* \* \*